US006632916B2

(12) United States Patent
Sato et al.

(10) Patent No.: US 6,632,916 B2
(45) Date of Patent: Oct. 14, 2003

(54) COMPOSITE TYPE CONDUCTIVE POLYMER AND PROCESS OF PRODUCING AROMATIC COMPOUND

(75) Inventors: Makoto Sato, Nishikasugai-gun (JP); Kuniyoshi Kondo, Nishikasugai-gun (JP); Mamoru Kato, Nishikasugai-gun (JP); Hiromitsu Tanaka, Aichi-gun (JP); Arimitsu Usuki, Aichi-gun (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 10/167,432

(22) Filed: Jun. 13, 2002

(65) Prior Publication Data

US 2003/0092878 A1 May 15, 2003

(30) Foreign Application Priority Data

Jun. 15, 2001 (JP) ....................................... 2001-182368

(51) Int. Cl.[7] ......................... C08G 63/78; C08G 63/91

(52) U.S. Cl. ....................... 528/206; 528/265; 528/397; 528/491; 528/494; 528/495; 528/499

(58) Field of Search ................................ 528/206, 205, 528/397, 491, 494, 495, 499

(56) References Cited

FOREIGN PATENT DOCUMENTS

JP 08-134189 5/1996

*Primary Examiner*—Duc Truong
(74) *Attorney, Agent, or Firm*—Posz & Bethards, PLC

(57) ABSTRACT

A composite type conductive polymer having a phenylene vinylene backbone with a condensed hydrocarbon ring system introduced into the backbone to form a bend in a linear structure of the phenylene vinylene backbone.

11 Claims, 3 Drawing Sheets

COMPOSITE TYPE CONDUCTIVE POLYMER AND PROCESS OF PRODUCING AROMATIC COMPOUND

FIELD OF THE INVENTION

This invention relates to a composite type conductive polymer, more particularly a composite type conductive polymer having a phenylene vinylene backbone. The present invention also relates to a process of producing an aromatic compound which can be used as a monomer for synthesizing the composite type conductive polymer. Conductive polymers are useful in the electric and electronic industries as various conductive materials or optical materials providing parts demanding high processability, such as electrodes, sensors, electronic display devices, nonlinear optical devices, and photoelectric devices, antistatic agents, automotive parts, electromagnetic shields, and the like.

BACKGROUND OF THE INVENTION

Poly(phenylene vinylene)s (hereinafter abbreviated as PPVs) have been engaging attention in the field of conductive polymers. PPVs are polymers having a phenylene vinylene skeleton (structure) in the main chain. On being doped with a dopant, PPVs form a charge transfer complex which exhibits electric conductivity and maintains high conductivity of at least about $10^1$ S/cm.

SUMMARY OF THE INVENTION

However, conductive PPVs reduce the conductivity below a practical level on about one day standing in the air probably because the dopant is released or deteriorated by the influences of the air. PPVs having a 1,4-phenylene chain (poly (para-phenylene vinylene) s), in particular, have a rigid linear molecular structure which tends to refuse a dopant's entering between molecules so that a dopant once accepted is liable to be released or deteriorated.

Having a linear molecular structure, PPVs possess so strong an intermolecular force that they are insoluble in most solvents. For the same reason, PPVs have no melting point. In other words, such insoluble and non-melting PPVs have poor processability and poor molding properties.

In the light of these circumstances, it is an object of the present invention to provide a conductive PPV which, when doped with a dopant, does not cause the dopant to be released or deteriorated and exhibits satisfactory processability.

As a result of extensive investigations, the present inventors have found that introducing a bend into the linear structure of the PPV's backbone results in reduction of the rigidity, which would suppress release and deterioration of the dopant. Based on this finding, the present inventors have reached the present invention.

The present invention provides a composite type conductive polymer having a phenylene vinylene backbone with a condensed hydrocarbon ring system introduced into the backbone to form a bend in the linear structure of the backbone.

Such a modified structure has reduced rigidity so that an external dopant enters between polymer molecules easily. Further, because the bend in the backbone reduces the intermolecular force, the polymer gains solvent solubility and satisfactory processability.

The condensed hydrocarbon ring system which can be introduced into the linear structure preferably includes those derived from naphthalene derivatives and anthracene derivatives.

In a preferred embodiment, the present invention provides a composite type conductive polymer having from 1 to 9999 of a phenylene vinylene backbone and from 1 to 9999 of a naphthylene vinylene backbone, wherein a total number of the phenylene vinylene backbone and the naphthylene vinylene backbone is from 10 to 10000.

In order to ensure protection for a dopant and improvement of processability, the naphthylene group in the preferred embodiment is desirably selected from a 1,5-naphthylene group, a 1,6-naphthylene group, a 2,5-naphthylene group, a 2,6-naphthylene group, and a 2,7-naphthylene group, which will make an appreciable bend in the backbone.

It is preferred that the ratio of the phenylene vinylene backbone to the naphthylene vinylene backbone in the above structure of the preferred embodiment be from about 3:7 to 7:3. With too high a proportion of the phenylene vinylene backbone, it is difficult to get much effect in protecting a dopant and improving the processability. Too high a proportion of the naphthylene vinylene backbone, on the other hand, tends to compromise the characteristics inherent to PPVS.

The present invention also provides a process of producing an aromatic compound as a monomer for synthesizing the composite conductive PPV of the invention. That is, the invention provides a process of producing an aromatic compound having a halomethyl group bonded to the benzene nucleus thereof, which starts with an aromatic compound having a carbon atom bonded to the benzene nucleus and comprises forming a halomethyl group through a substitution reaction on the carbon atom. According to the process, a desired aromatic compound can be obtained in good yield. This will make it possible to synthesize the composite type conductive polymer of the invention efficiently.

In one embodiment of the process, an aromatic compound having a carboxyl group bonded to the benzene nucleus is used as a starting material, and the process comprises:

(1) a halogenating step in which the hydrogen of the carboxyl group is substituted by a halogen to form a carboxyl halide, (2) a carboxymethylating step in which the halogen of the carboxyl halide is substituted with a methyl group to form a carboxymethyl group, (3) a hydroxymethylating step in which the hydroxyl group of the hydroxymethyl group is substituted with a halogen to form a halomethyl group, and (4) a halomethylating step in which the hydroxyl moiety of the hydroxymethyl group is substituted with a halogen to form a halomethyl group.

In another embodiment of the process, an aromatic compound having a methyl group on the benzene nucleus thereof is used as a starting material, and the process comprises substituting one of the hydrogen atoms of the methyl group with a halogen.

DETAILED DESCRIPTION OF THE INVENTION

Figure 1:
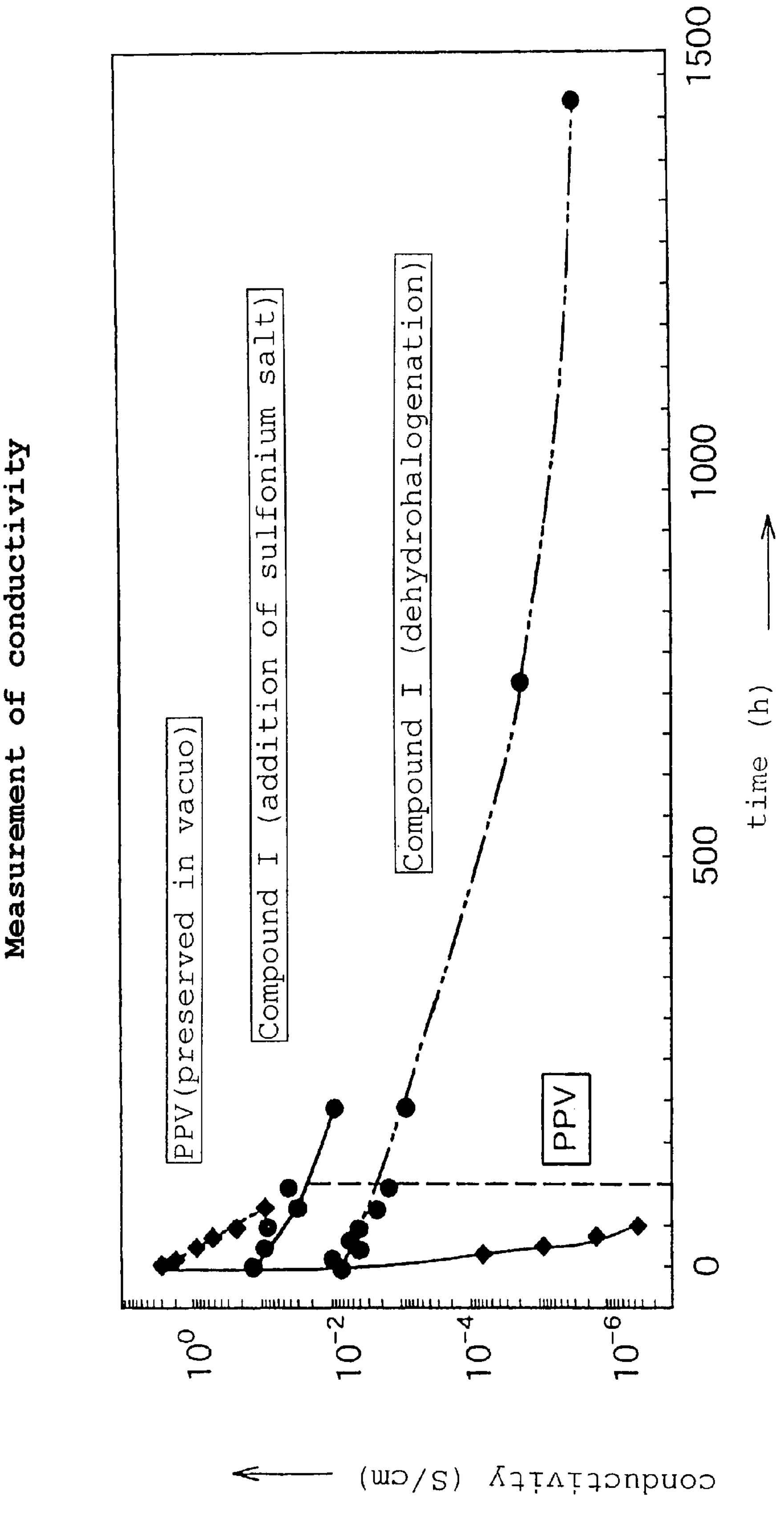
FIG. 1 is a graph showing conductivity change with time of the conductive polymers prepared in Examples and Comparative Examples.

The composite type conductive polymer of thee present invention is of the type having a phenylene vinylene chain as a backbone and is characterized by having a bend (or a steric strain as it is called) introduced into the linear structure of the backbone.

The bend formed in the backbone reduces the rigidity of the backbone and assists a dopant to enter between the polymer molecules. Compared with rigid linear molecules, the molecules having the bending backbone wraps a dopant having once entered thereby giving a dopant protection. Further, since the bend reduces the intermolecular force of the polymer, the polymer easily dissolves in a solvent and possesses a melting point to exhibit improved processability.

The effect of the present invention is particularly pronounced where applied to a PPV having a 1,4-phenylene bond, which is the most linear and rigid of the other phenylene bonds.

A bend can be formed in the linear backbone by introducing a condensed hydrocarbon ring system into the backbone. The condensed hydrocarbon ring system includes abicyclic structure, such as a naphthalene derivative, a tricyclic structure, such as an anthracene derivative, a polycyclic structure, such as a polypyrene system, a polyazulene system or a polyfluorene system, various heterocyclic structures having aromaticity and containing N, S or O as a hetero atom, and a phenanthrene derivative.

Of the above condensed ring systems preferred are those derived from naphthalene derivatives or anthracene derivatives. The term "derivatives" as used herein is intended to include naphthalene or anthracene having a substituent(s), such as an alkyl group, an alkoxy group, an alkyl ester group, a halogen atom, anitrogroup, acyanogroup, anaminogroup, atrihalomethyl group, and a phenyl group, on the condensed rings.

The condensed hydrocarbon ring system can be introduced into the linear backbone by copolymerizing a monomer having a phenylene vinylene skeleton (hereinafter referred to as a PV monomer) with a monomer having a condensed hydrocarbon ring system capable of providing a bend in the resulting polymer chain, such as a monomer having a naphthalene vinylene skeleton (hereinafter referred to as an NV monomer).

Any copolymerization mode including alternate copolymerization, partial block copolymerization, and random copolymerization can be adopted as long as a bend is introduced into the phenylene vinylene backbone.

The composite type conductive polymer of the invention includes a composite type conductive polymer having from 1 to 9999 of a phenylene vinylene backbone and from 1 to 9999 of a naphthylene vinylene backbone, wherein a total number of the phenylene vinylene backbone and the naphthylene vinylene backbone is from 10 to 10000.

In the above-described composite type conductive polymer, where one of the bonds of the naphthylene group to the main polymer chain is at the 1-, 2-, 3- or 4-position, the other bond must be at the 5-, 6-, 7- or 8-position. That is, the two bonds must be on different rings. As long as the two bonds are in such a configuration, the polymer chain will not have linearity, and a bend will be formed without fail. That is, the copolymer is structurally asymmetric and has a kink in the backbone. As a result, the intermolecular force attributed to a rigid linear structure decreases so that an external dopant enters between molecules easily. A dopant having once entered is embraced by the bending molecular chains and therefore protected against release and deterioration. The polymer with this bending backbone gains in flexibility, showing satisfactory thermal melting properties and improved processability.

The expression "structurally asymmetric" as referred to above means that the structure that would have been regular if the polymer is made up solely of a PV monomer has lost its regularity by inserting a different recurring unit. The term "composite" as used herein implies that two different monomer units are combined. While the 2,7-bond structures and the like as shown below macroscopically form a symmetrical linear structure, the existence of a naphthalene moiety different in size from the phenylene moiety brings about steric hindrance or intermolecular force variation. Therefore, the structures shown below are included under the "composite type conductive polymer" as intended in the present invention.

It is desirable that the naphthylene group be selected from 2,5-naphthylene, 2,6-naphthylene, 2,7-naphthylene, 1,5-naphthylene, and 1,6-naphthylene. These naphthylene groups make an appreciable bend in the backbone to ensure protection for a dopant and improvement of processability. It is more desirable that the naphthylene group be selected from 2,6-naphthylene and 2,7-naphthylene.

It is preferred that the ratio of the phenylene vinylene backbone to the naphthylene vinylene backbone in the conductive polymer of the invention be from about 3:7 to 7:3. With too high a proportion of the phenylene vinylene backbone, it is difficult to get much effect in protecting a dopant and improving the processability. Too high a proportion of the naphthylene vinylene backbone, on the other hand, tends to compromise the characteristics inherent to PPVs.

Any electron-donating substance or electron-accepting substance can be used as a dopant in the present invention. Examples of suitable dopants are alkoxysulfonic acids, hydrogen borofluoride, carboxylic acids, sulfonic acids, and nitro compounds.

While the present invention has been described with particular reference to a conductive polymer which is to be doped with an external dopant, the composite type conductive polymer can have a self-doping group. A self-doping group is a functional group serving as a dopant which is covalently bonded to the polymer either directly or via a spacer so as to give the polymer controlled conductivity.

A composite type conductive polymer having a self-doping group is free from dopant's release and deterioration and undergoes reduced reduction in conductivity in the air. Self-doping groups include alkoxysulfonic acid groups ($-O(CH_2)_xSO_3H$, wherein the alkyl moiety is preferably a straight-chain or branched alkyl group having 1 to about 4 carbon atoms (x=1 to about 4)). The alkoxysulfonic acid group can be bonded to the phenylene group at opposing positions, for example, 2,5-positions or 3,6-positions of a 1,4-phenylene group, in a usual manner.

An initial conductivity of the composite type conductive polymer is at least $10^{-2}$ S/cm, preferably $10^{-1}$ S/cm.

The composite type conductive polymer of the invention is synthesized by copolymerizing aromatic compounds having a halomethyl group as a polymerizable group. Copolymerization of aromatic compounds having a halomethyl group is carried out in a conventional manner as described later.

The aromatic compounds having a halomethyl group on the benzene nucleus thereof could be prepared by a known process comprising substituting hydrogen (–H) or a halogen (–R) directly bonded to the aromatic ring (e.g., a naphthalene nucleus) of a starting aromatic compound, e.g., naphthalene or a dihalonaphthalene, to form a halomethyl group, as illustrated by the following reaction schemes:

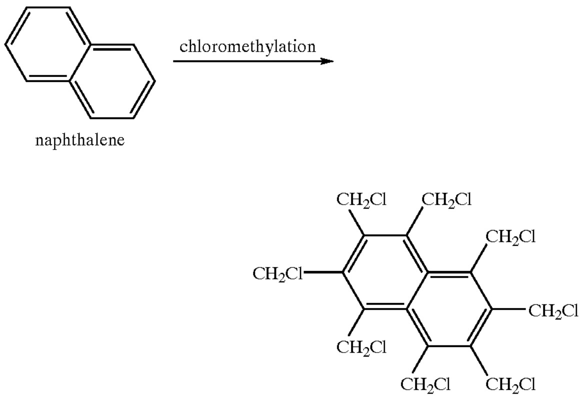

naphthalene

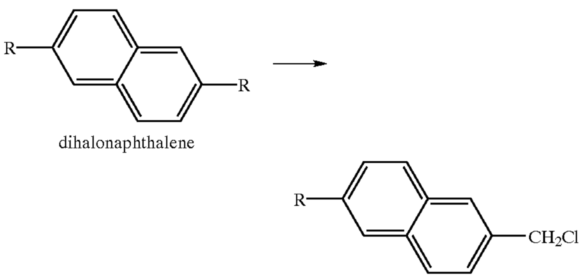

dihalonaphthalene

R: Cl or Br

However, substitution of hydrogen is uncontrollable as to the position of substitution, and substitution of halogen has poor yield. Therefore, the aromatic compounds are preferably prepared by the process provided by the present invention. The process of the invention is characterized by starting with an aromatic compound having a carbon atom bonded to the benzene nucleus and comprising forming a halomethyl group through a substitution reaction on that carbon atom.

The process of the invention provides a desired aromatic compound in high yield with easy control of the position where a halomethyl group is introduced because the reactions involved are only substitution reactions on the carbon atom bonded to the benzene nucleus. As a result, the composite type conductive polymer of the present invention can be synthesized efficiently.

A benzene nucleus as referred to herein includes one present in condensed benzene rings, such as naphthalene and anthracene, and one present independently. Both of them are applicable to the process of the invention.

The process of producing the aromatic compound having a halomethyl group according to the invention includes the following processes A and B.

Process A starts with an aromatic compound having a carboxyl group bonded to the benzene nucleus and comprises:

(1) a halogenating step in which the hydrogen of the carboxyl group is substituted by a halogen to form a carboxyl halide, (2) a carboxymethylating step in which the halogen of the carboxyl halide is substituted with a methyl group to form a carboxymethyl group, (3) a hydroxymethylating step in which the carboxymethyl group is reduced to a hydroxymethyl group, and (4) a halomethylating step in which the hydroxyl moiety of the hydroxymethyl group is substituted with a halogen to form a halomethyl group.

Process B starts with an aromatic compound having a methyl group on the benzene nucleus thereof and comprises substituting one of the hydrogen atoms of the methyl group with a halogen. Process B utilizes Wohl-Ziegler reaction for halogenating methylene hydrogen adjacent to an aromatic ring or a double bond.

A halomethyl group acts as a polymerizable group. Monomers having a halomethyl group at different positions provide polymers having different steric structures and therefore exhibiting different physical properties as described above. Hence, the process of the present invention is very effective for controllability of the position of a halomethyl group.

Processes A and B will be described in more detail by way of illustrative reaction schemes.

Conditions for syntheses hereinafter described are subject to alteration with variation of temperature, pressure, etc. as is obvious to one skilled in the art. Therefore, it should be understood that the conditions described are no more than illustrative examples, still less limiting the present invention. In other words, the synthesis conditions are subject to alteration within ranges designable by artisans. Likewise, solvents and the like used here are no more than typical examples, and whatever fit for the intended purposes, such as dissolution, separation, and washing, can be used according to the purpose.

For instance, solvents can be selected from water, sulfuric acid, fuming sulfuric acid, forming acid, acetic acid, propionicacid, aceticanhydride, ethers (e.g., tetrahydrofuran, dioxane, and diethyl ether), polar solvents (e.g., dimethylformamide, acetonitrile, benzonitrile, N-methylpyrrolidone, and dimethyl sulfoxide), esters (e.g., ethyl acetate and butyl acetate), non-aromatic chlorine-containing solvents (e.g., chloroform and methylene chloride), and mixtures of two or more thereof.

Process A, which starts with an aromatic compound having a carboxyl group bonded to the benzene nucleus thereof, is described with reference to an example shown in the following reaction scheme:

Scheme of process A:

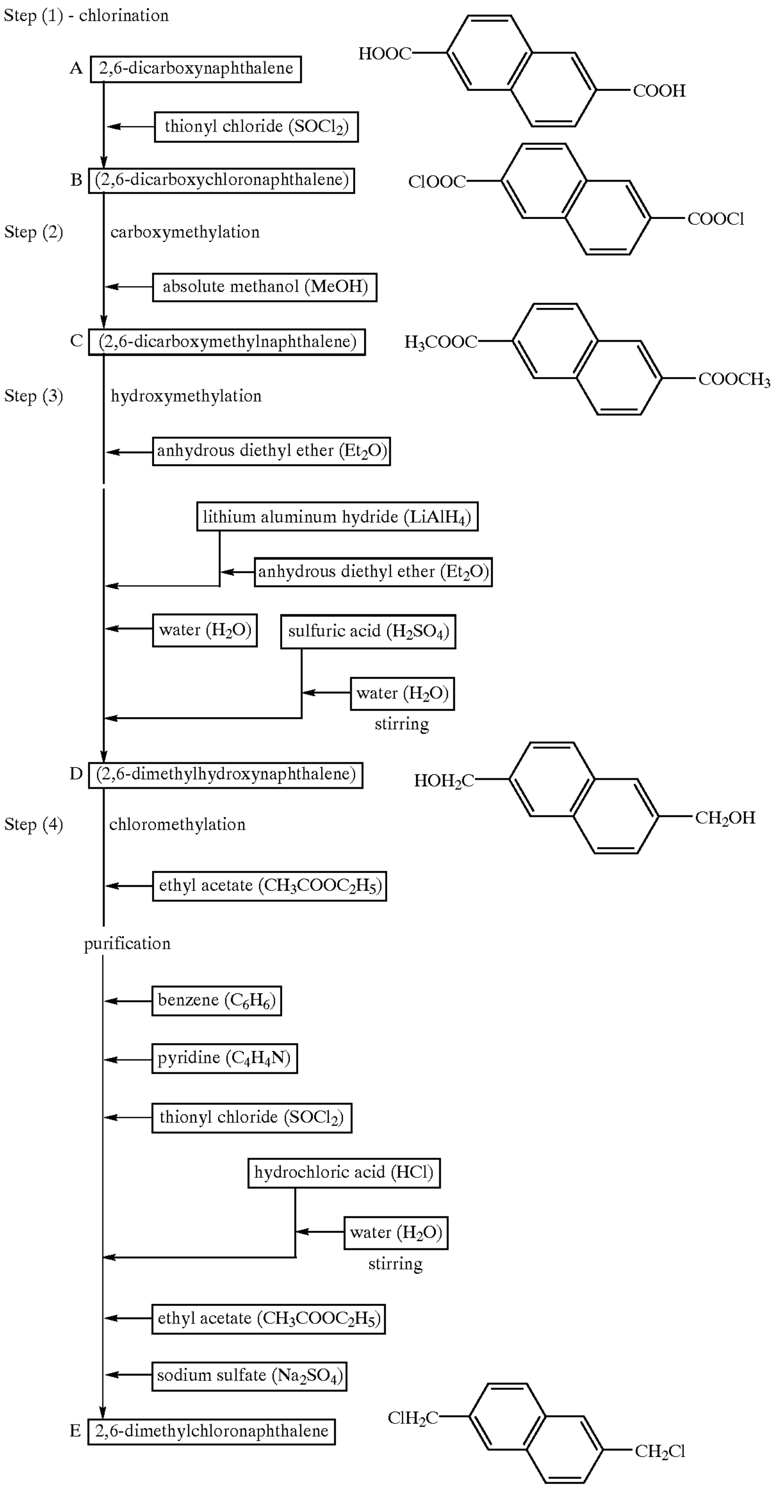

Step (1)—Halogenation 2,6-Dicarboxynaphthalene having carboxyl groups bonded to a naphthalene nucleus, designated compound A, is chosen as a starting compound. Two moles of thionyl chloride is added to one mole of compound A, and the mixture is heated to about 75 to 90° C., preferably about 80° C., with stirring in a nitrogen atmosphere. Then the stirring force is diminished, and the reaction mixture is refluxed for about 6 to 18 hours, desirably about 10 to 12 hours. The bath temperature is set at about 90 to 100° C., at which unreacted thionyl chloride is removed by evaporation over about 2 hours to obtain 2,6-dicarboxychloronaphthalene, designated compound B.

This reaction is substitution of hydrogen of the carboxyl group with halogen. The starting material is not limited to the naphthalene derivative as chosen above, and other aromatic compounds, such as benzene derivatives and heterocyclic compounds, having a carboxyl group bonded to a benzene ring are usable. Compound B, being labile at room temperature, is kept cooled in an ice bath.

Step (2)—Carboxymethylation

This step is substitution of the halogen of the carboxylic acid halide obtained in step (1) with a methyl group. To 1 mol of compound B (cooled in an ice bath) is added dropwise 1000 ml of absolute methanol that has sufficiently been cooled in an ice bath. The system is stirred in an ice bath to dissolve compound B and then refluxed in an oil bath at about 75 to 90° C., preferably about 80° C., for about 0.5 to 2 hours, preferably about 1 to 1.5 hours. Unreacted methanol was evaporated in an oil bath at about 80 to 100° C., preferably about 90° C., for about 1 to 3 hours. The reaction mixture is dried in vacuo (about −98 kPa; gauge pressure) at about 20° C. until no methanol is detected (for about 1 to 3 hours) to obtain 2,6-dicarboxymethylnaphthalene, designated compound C.

Step (3)—Hydroxymethylation

This step is reduction of the carboxymethyl group of compound C to a hydroxymethyl group. To 1 mol of compound C is added 1000 ml of anhydrous diethyl ether at ambient temperature in a nitrogen atmosphere. Separately, 2 mol of lithium aluminum hydride (reducing agent) is dissolved in 500 ml of anhydrous diethyl ether by stirring at ambient temperature for at least about 30 minutes in a nitrogen atmosphere. The compound C solution is added dropwise to the lithium aluminum hydride solution at ambient temperature over at least about 5 hours, followed by stirring for about 5 hours.

After hydrogen evolution has ceased, and the reaction has completed, the reaction mixture is refluxed in an oil bath at about 45 to 55° C., preferably about 50° C., in a nitrogen atmosphere. After completion of the reaction, water (ambient temperature) is slowly added thereto over at least about 60 minutes, preferably about 9:0 minutes, to treat the unreacted matter. Diluted sulfuric acid (about 20%) is added thereto, followed by stirring at ambient temperature to adjust to pH 3 to 4. The precipitated white crystals are collected by suction filtration, dried in vacuo (at about −760 mmHg) at about 20° C. for about 1 to 6 hours to obtain a white solid. The crude product is dissolved in ethyl acetate by heating at about 60 to 80° C., preferably about 70° C., and the solution is allowed to stand in a sealed container at about −5° C. or below for about 6 to 24 hours. The precipitated white crystals are collected by suction filtration and dried in vacuo (at about −760 muHg) at about 20° C. for about 1 to 3 hours to give 2,6-dimethylhydroxynaphthalene (compound D).

Step (4)—Halomethylation

This step is substitution of the hydroxyl moiety of the hydroxymethyl group in compound D with halogen to form a halomethyl group. To about 1 mol of compound D are added about 900 ml of benzene:and about 180 ml of pyridine, and the mixture is stirred at ambient temperature for about 30 minutes in a moisture-free condition. About 2 mol of thionyl chloride is added to the mixture, followed by refluxing with stirring at about 70 to 90° C., preferably about 80° C., for about 12 to 24 hours, preferably about 18 to 20 hours.

After completion of the reaction, an adequate amount of a hydrochloric acid aqueous solution (containing hydrochloric acid in excess over pyridine) is added to the reaction mixture, followed by stirring for about 20 minutes to carry out neutralization. An adequate amount of ethyl acetate is added to the reaction mixture, followed by stirring at ambient temperature for about 30 minutes. The precipitated solid is filtered off by suction. The filtrate is agitated in a separatory funnel, and the organic layer (ethyl acetate layer) is recovered. Water is added again, and the mixture is agitated and separated by means of a separator funnel three times in total to remove the aqueous layer. The organic layer is dried over an adequate amount of sodium sulfate and filtered. The solvent (ethylacetate) of the filtrate is evaporated under reduced pressure in a water bath at about 35 to 45° C., preferably about 40° C., to give a solid.

The resulting solid is dissolved in an appropriate amount of ethanol under heat with stirring, and the solution is allowed to stand at about 10 to 30° C., preferably about 15 to 20° C., for about 24 to 48 hours in a sealed container for recrystallization. The solid thus precipitated is collected by suction filtration and dried in vacuo to yield dichloromethylnaphthalene (compound E) as a white powder in a yield of about 50% or higher.

Process B, which starts with an aromatic compound having a methyl group bonded to the benzene nucleus thereof, is described with reference to an example shown in the following reaction scheme:

Scheme of process B:

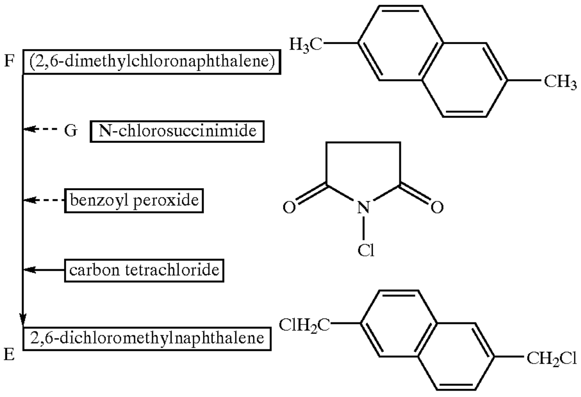

This process comprises substituting one of the hydrogen atoms of the methyl group with a halogen to form a halomethyl group. As a starting material, 2,6-dimethylnaphthalene (compound F) having methyl groups bonded to the naphthalene nucleus is chosen. To 1 mol of compound F are added 2 mol of N-chlorosuccinimide (compound G) as a halogenating agent and about 0.05 to 0.1 mol, preferably about 0.08 mol, of benzoyl peroxide as a catalyst, and the mixture is stirred at ambient temperature for about 15 minutes.

The halogenating agent (chlorinating agent in this example) is used in an advisable amount of 1 to about 1.5 mol per mole of the alkyl groups of the starting compound (methyl groups in this example). The catalyst is used in an advisable amount of about 1/40 to 1/20 mol per mole of the halogenating agent.

An adequate amount of dehydrated carbon tetrachloride or chloroform is added to the reaction system as a solvent, and the mixture is heated at a water bath temperature of about 85 to 95° C., preferably about 90° C. (the boiling point of the solvent), for about 30minutes while stirring under a moisture-free condition. When the solution turned yellow, the water bath temperature is raised to about 90 to 110° C., preferably about 100° C., and the solution is refluxed for about 3 hours with mild stirring. After completion of the reaction, the reaction system is cooled in an ice bath for about 30 minutes.

The solid thus precipitated is collected by filtration by suction and dried in vacuo. The resulting white crystal powder is washed with water to remove the halogenating are known techniques as disclosed, e.g., in JP-W-8-510489 (the term "JP-W" as used herein means an "a published Japanese national stage of international application").

Process C involving dehydrohalogenation is described with reference to the example shown in the following reaction scheme.

Scheme of process C:

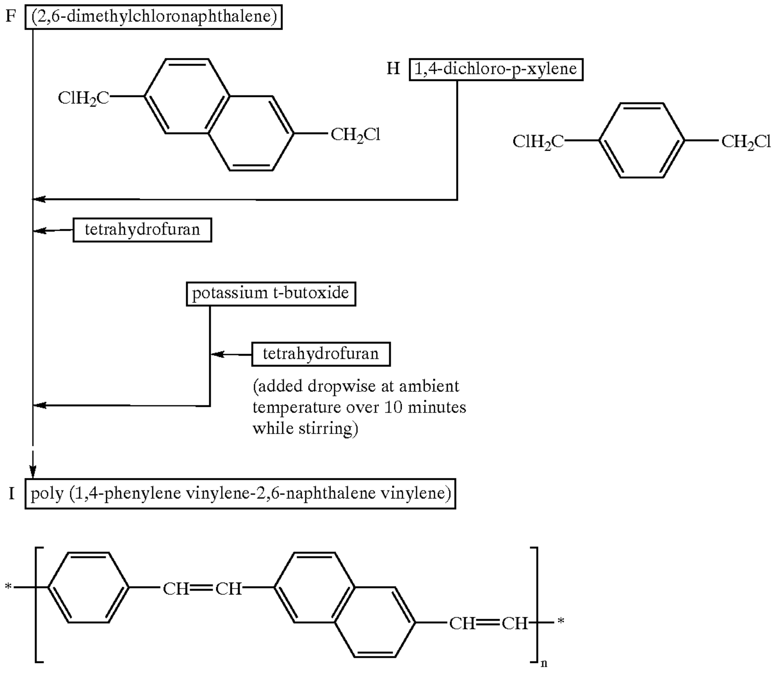

agent, filtered by suction, and dried in vacuo. The solid is further washed with pentane to remove any unreacted material, filtered by suction, and dried in vacuo to give compound E in a yield of about 90% or higher.

In process B, the starting material is not limited to the naphthalene derivative chosen above, and other aromatic compounds, such as benzene derivatives and aromatic heterocyclic compounds, having a methyl group bonded to a benzene ring are usable.

The halogenating agent is not limited to n-chlorosuccinimide used above. For example, use of n-bromosuccinimide results in formation of a bromomethylated compound, which can be used as a monomer similarly to the chloromethylated compound.

Either of processes A and B successfully achieves introduction of a halomethyl group into a benzene nucleus in high yield. The dichloromethylnaphthalene thus prepared is used to synthesize poly (naphthalene vinylene).

In the same manner as described above (process A), dichloro-p-xylene can be synthesized from terephthalic acid, which is copolymerized with 2,6-dichloromethylnaphthalene synthesized above to prepare the composite type conductive polymer represented by formula (I-b).

Polymerization of the above-described aromatic compounds can be carried out by, for example, process C involving dehydrohalogenation or process D involving conversion to a sulfonium salt. These polymerization processes In an appropriate amount of tetrahydrofuran (THF) are dissolved about 1 mol of 2,6-dichloromethylnaphthalene (compound E) and about 1 mol of dichloro-p-xylene (compound H), and the solution is stirred in an ice bath (about 5° C.). A solution prepared by dissolving about 3 mol of potassium t-butoxide as a polymerization initiator in an adequate amount of THF at ambient temperature is added dropwise to the cold monomer solution while stirring over about 10 minutes, and the stirring is continued in an ice bath for about 8 to 12 hours, preferably about 10 hours, to give poly(1,4-phenylene vinylene-2,6-naphthalene vinylene) (compound I) in a yield of about 90% or higher. The resulting composite type conductive polymer usually has a molecular weight of 20,000 to 50,000.

Process D comprises adding a sulfonium salt (e.g., dimethyl sulfide or tetrahydrothiophene (THT)) to the chloromethyl groups of the monomers (step (1)), polycondensing the addition products to form a solubilized intermediate polymer (step (2)), and forming vinylene bonds to obtain compound I (step (3)).

Step (1)—Addition of Sulfonium Salt

In an appropriate amount of methanol are dissolved about 1 mol of compound E and about 1 mol of compound H, and about 2.5 mol. of THT is added to the solution, followed by heating with stirring in a nitrogen atmosphere. The mixture is refluxed at about 45 to 55° C., preferably about 50° C. or below, for about 12 to 36 hours, preferably about 24 hours. The solvent and any unreacted matter are removed by evaporation under reduced pressure at about 25 to 40° C., preferably about 30° C., to give a viscous substance. An appropriate amount of dehydrated acetone is added thereto, and the system is allowed to stand in a sealed container at about −5° C. or below for at least about 12 hours, preferably at least about 48 hours. The solid thus precipitated is collected by suction filtration and dried in vacuo to give a mixture of the monomers having a sulfonium salt added to their polymerizable chloromethyl groups.

The reagent to be used for sulfonium salt addition is not limited to THT. For example, dialkyl sulfides such as dimethyl sulfide and diethyl sulfide are also useful. It is desirable to select such a sulfonium salt that is easily releasable in the subsequent heating in vacuo step at a temperature that does not influence the alkoxysulfonic acid moiety.

Step (2)—Polycondensation of Sulfonium Salt

In about 500 ml of water is dissolved about 1 mol of the product from step (1), and the solution is stirred in an ice bath for about 60 to 180 minutes,preferably about 120 minutes, while deaerating by bubbling with nitrogen. To the solution is added dropwise about 1000 to 2000 ml of a 1 mol/l solution of sodium hydroxide, and the mixture is stirred in an ice bath for about 24 hours while deaerating. The resulting viscous solution is put into a dialysis tube (cut-off molecular weight: 12,000 or greater), and the tube is sealed and immersed in distilled water. The dialyzate is concentrated by low-temperature vacuum distillation to yield a polycondensate.

The alkali solution used for polymerization reaction is not limited to the sodium hydroxide solution used above. For example, other alkali metal hydroxides, e.g., KOH, and alkaline earth metal hydroxides, e.g., $Ba(OH)_2$ and $Ca(OH)_2$, are useful as well. The cut-off molecular weight of the dialysis tube is subject to alteration according to the purpose.

Step (3)—Vinylene Formation

An aqueous solution of the polycondensate obtained in step (2) is cast into film. The cast film is heated in vacuo at about 180 to 250° C., preferably about 200 to 220° C., for about 6 to 24 hours, preferably about 12 to 18 hours, whereby the sulfonium salt is released to form compound I having a phenylene vinylene backbone and a naphthylene vinylene backbone.

The form of compound I includes not only film but powder, etc. The heat treating temperature in step (3) is subject to variation depending on the kinds of the alkoxy moiety and the sulfonium salt, the sample size, and the like.

The resulting copolymer is a composite type conductive polymer exhibiting a satisfactory effect of dopant protection and excellent processability.

The composite type conductive polymer according to the present invention has bends in the backbone thereby exhibiting reduced molecular rigidity. As a result, an external dopant is ready to enter between molecules and, after once having entered, is given better protection by the bending and therefore wrapping backbone than by linear and rigid molecules. Further, since the polymer has its intermolecular force reduced by the bends, it is solubilized in a solvent and has a melting point to exhibit improved processability.

The process of producing aromatic compounds according to the invention enables introduction of a halomethyl group only to desired sites on the benzene nucleus of an aromatic compound (naphthalene derivatives, anthracene derivatives, benzene derivatives, and the like) to provide desired compounds with high purity in high yield.

EXAMPLES

The effects of the present invention will be demonstrated in the following Examples.

Examples 1 and 2 and Comparative Examples 1 and 2

Compound I was synthesized by process D involving addition of a sulfonium salt (Example 1) or process C involving dehydrohalogenation (Example 2). The polymer of Example 1 synthesized by process D had an average molecular weight of 106,000 and a phenylene vinylene backbone to naphthylene vinylene backbone ratio of 1:1. The polymer of Example 2 synthesized by process C had an average molecular weight of 112,000 and a phenylene vinylene backbone to naphthylene vinylene backbone ratio of 1:1. PPV was used as a comparative conductive polymer. Hydrogen borofluoride ($HBF_4$) was used as an external dopant. The average molecular weight of the polymers was measured by gel-permeation chromatography using polyethylene glycol standards available from Wako Pure Chemical Industries, Ltd.

The conductivity of the conductive polymers was measured with a resistance meter Low Rester GP, supplied by Mitsubishi Chemical Corp., with a four-point probe array according to JIS K7194. The results obtained are shown in FIG. 1. As can be seen from FIG. 1, while all the conductive polymers of Examples and Comparative Examples reach a satisfactory conductivity, the reduction in conductivity with time shown by the composite PPVs of Examples 1 and 2 is apparently smaller than that shown by the comparative PPVs, proving that introduction of a bend into the polymer backbone makes it possible to obtain satisfactory conductivity for an extended period of time.

Figure 2:
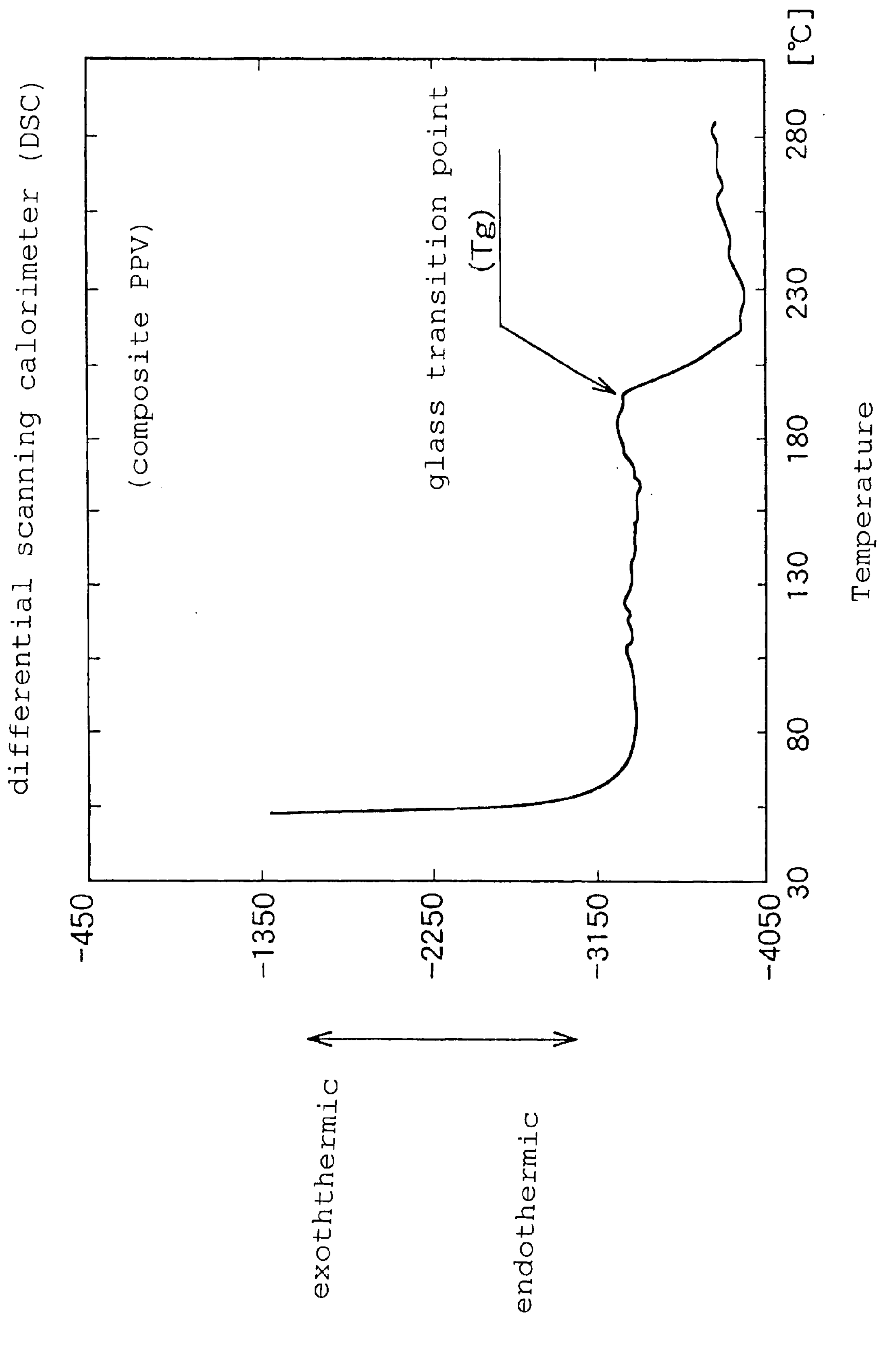
FIG. 2 is a DSC thermogram of the composite type conductive polymer of Example 1.

Further, the composite type conductive polymer of Example 1 was subjected to differential thermal analysis with a differential scanning calorimeter DSC K20, supplied by Shimadzu Corp., to measure the glass transition point. The resulting DSC thermogram is shown in FIG. 2. A glass transition point (a temperature at which polymer molecules begin to have motion) appears in the vicinity of 200° C., which suggests that the polymer can be softened to exhibit good processability and possibly shows flexibility for protecting a dopant.

Example 3

3,6-Dimethylphenanthrene (produced by Tokyo Kasei Kogyo Co., Ltd.) represented by the following formula is subjected to halogenation and conversion to sulfonium salt in the same manner as in the synthesis of naphthalene derivative to synthesize a phenanthrene derivative monomer.

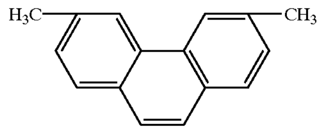

The phenanthrene derivative monomer thus synthesized is mixed with the phenylene derivative monomer, and then subjected to condensation polymerization and vinylation to obtain a phenanthrene-composite conductive polymer represented by the following formula:

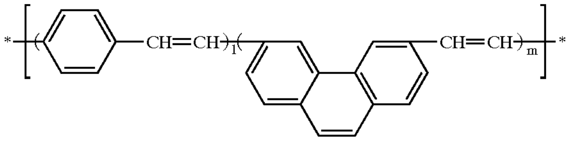

The phenanthrene-composite conductive polymer of Example 3 comprises a phenylene vinylene backbone and a phenanthrene vinylene backbone at a ratio of 7:3. As a dopant there was used $HBF_4$.

Example 4

The same phenanthrene-composite conductive polymer as used in Example 3 was used. As a dopant there was used $H_2SO_4$.

Figure 3:
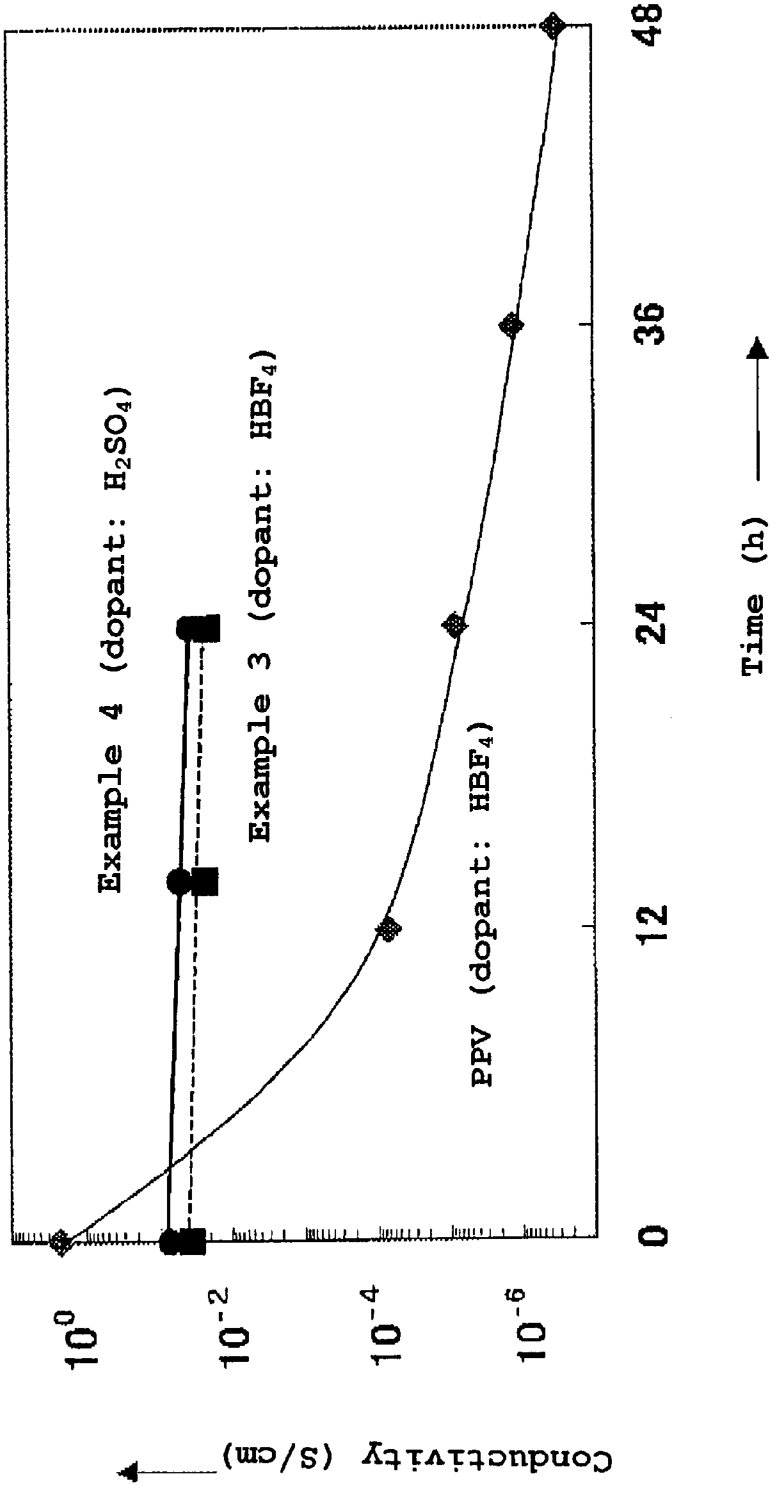
FIG. 3 is a graph showing the change of conductivity of the PPV polymers of Examples 3 and 4 and a comparative PPV with time.

The measurements of conductivity of Examples 3 and 4 are shown in FIG. 3.

As can be seen in FIG. 3, the phenanthrene-composite PPV polymers of Examples 3 and 4 each exhibit a good conductivity and a conductivity change with time which is obviously smaller than that of the comparative PPV.

This application is based on Japanese Patent application JP 2001-182368, filed Jun. 15, 2001, the entire content of which is hereby incorporated by reference, the same as if set forth at length.

What is claimed is:

1. A composite type conductive polymer having a phenylene vinylene backbone with a condensed hydrocarbon ring system introduced into the backbone to form a bend in a linear structure of the phenylene vinylene backbone.

2. The composite type conductive polymer according to claim 1, wherein the condensed hydrocarbon ring system is one of a naphthalene derivative, an anthracene derivative and a phenanthrene derivative.

3. The composite type conductive polymer according to claim 2, which has an initial conductivity of at least $10^{-2}$ S/cm.

4. A composite type conductive polymer having from 1 to 9999 of a phenylene vinylene backbone and from 1 to 9999 of a naphthylene vinylene backbone, wherein a total number of the phenylene vinylene backbone and the naphthylene vinylene backbone is from 10 to 10000.

5. The composite type conductive polymer according to claim 4, wherein the naphthylene group in the naphthylene vinylene backbone is a 1,5-naphthylene group, a 1,6-naphthylene group, a 2,5-naphthylene group, a 2,6-naphthylene group or a 2,7-naphthylene group.

6. The composite type conductive polymer according to claim 4, wherein a ratio of the phenylene vinylene backbone to said naphthylene vinylene backbone is from about 3:7 to 7:3.

7. A process of producing an aromatic compound having a halomethyl group bonded to the benzene nucleus thereof, the process comprising forming a halomethyl group through a substitution reaction on a carbon atom of an aromatic compound having the carbon atom bonded to a benzene nucleus thereof.

8. The process of producing the aromatic compound according to claim 7, which comprises:

(1) a halogenating step in which a hydrogen of a carboxyl group of an aromatic compound having the carboxyl group bonded to a benzene nucleus thereof is substituted by a halogen to form a carboxyl halide;

(2) a carboxymethylating step in which a halogen of the carboxyl halide is substituted with a methyl group to form a carboxymethyl group;

(3) a hydroxymethylating step in which the carboxymethyl group is reduced to a hydroxymethyl group; and (4) a halomethylating step in which a hydroxyl moiety of the hydroxymethyl group is substituted with a halogen to form a halomethyl group.

9. The process of producing the aromatic compound according to claim 7, which comprises substituting one of hydrogen atoms of a methyl group of an aromatic compound having the methyl group bonded to a benzene nucleus thereof with a halogen.

10. A process of producing a composite type conductive polymer having from 1 to 9999 of a phenylene vinylene backbone and from 1 to 9999 of a naphthylene vinylene backbone, wherein a total number of the phenylene vinylene backbone and the naphthylene vinylene backbone is from 10 to 10000, the process compring using an aromatic compound produced by the process according to claim 8 as a monomer.

11. A process of producing a composite type conductive polymer having from 1 to 9999 of a phenylene vinylene backbone and from 1 to 9999 of a naphthylene vinylene backbone, wherein a total number of the phenylene vinylene backbone and the naphthylene vinylene backbone is from 10 to 10000, the process compring using an aromatic compound produced by the process according to claim 9 as a monomer.

* * * * *